United States Patent
Jordan et al.

(10) Patent No.: US 6,634,964 B2
(45) Date of Patent: Oct. 21, 2003

(54) INITIAL VELOCITY DUAL CORE GOLF BALL

(75) Inventors: Michael D Jordan, East Greenwich, RI (US); Jeffrey L. Dalton, North Dartmouth, MA (US); Christopher Cavallaro, Lakeville, MA (US)

(73) Assignee: Acushnet Company, Fairhaven, MA (US)

( * ) Notice: Subject to any disclaimer, the term of this patent is extended or adjusted under 35 U.S.C. 154(b) by 3 days.

(21) Appl. No.: 10/075,713

(22) Filed: Feb. 13, 2002

(65) Prior Publication Data

US 2002/0137577 A1 Sep. 26, 2002

Related U.S. Application Data

(63) Continuation-in-part of application No. 09/782,782, filed on Feb. 13, 2001, and a continuation-in-part of application No. 09/721,740, filed on Nov. 27, 2000, which is a continuation-in-part of application No. 09/311,591, filed on May 14, 1999, now Pat. No. 6,210,294, which is a continuation-in-part of application No. 09/274,015, filed on Mar. 22, 1999, which is a continuation-in-part of application No. 08/863,788, filed on May 27, 1997, now Pat. No. 5,885,172, and a continuation-in-part of application No. 09/461,736, filed on Dec. 16, 1999.

(51) Int. Cl.⁷ .................. A63B 37/04; A63B 37/06; A63B 37/00; A63B 37/08
(52) U.S. Cl. .................. 473/377; 473/371; 473/351; 473/367
(58) Field of Search .................. 473/351–377

(56) References Cited

U.S. PATENT DOCUMENTS

| 3,147,324 A | 9/1964 | Ward ................. 264/254 |
| 3,177,280 A | 4/1965 | Ford et al. ........... 264/254 |
| 3,239,228 A | 3/1966 | Crompton ............ 273/218 |
| 3,262,272 A | 7/1966 | Barakauskas et al. ...... 60/39.05 |
| 3,572,721 A | 3/1971 | Harrison et al. ........ 372/218 |
| 3,572,722 A | 3/1971 | Harrison et al. ........ 273/218 |
| 3,616,101 A | 10/1971 | Satchell et sl. .......... 161/7 |
| 3,666,272 A | 5/1972 | Walker et al. ......... 273/218 |
| 3,804,421 A | 4/1974 | Alex et al. ........... 273/218 |
| 3,808,077 A | 4/1974 | Rieser et al. ......... 156/102 |
| 3,926,933 A | 12/1975 | Naylor ............... 260/94.3 |

(List continued on next page.)

FOREIGN PATENT DOCUMENTS

| AU | A-16547/97 | 2/1997 |
| AU | A-16548/97 | 2/1997 |
| EP | 0 577 058 A1 | 1/1994 |
| EP | 0 903 357 A1 | 3/1999 |
| GB | 1 168 609 | 10/1969 |
| GB | 1 209 032 | 10/1970 |
| GB | 2278609 | 7/1994 |
| GB | 2291811 | 7/1996 |
| GB | 2291812 | 7/1996 |
| GB | 2291817 | 7/1996 |
| GB | 2 321 021 A | 3/1997 |
| GB | 2 321 021 | 7/1998 |
| WO | WO 98/37929 | 9/1998 |

OTHER PUBLICATIONS

Raj B. Durairaj et al., "Cast Polyurethanes From Resorcinol–Based Aromatic Diols" (Oct. 10–14, 1998).
Raj B. Durairaj, "HER Materials For Polyurethane Applications" (Spring, 1999).

*Primary Examiner*—Paul T. Sewell
*Assistant Examiner*—Alvin A. Hunter, Jr.
(74) *Attorney, Agent, or Firm*—William B. Lacy

(57) ABSTRACT

A golf ball comprising a core and a cover layer, wherein the core has an outer diameter of no greater than about 1.62 inches; the cover layer comprises an inner cover layer and an outer cover layer having a material hardness of less than about 60 Shore D; and at least one of the core or the cover comprises high-Mooney-viscosity rubber, high-Mooney-viscosity rubber regrind, or a mixture thereof.

20 Claims, 1 Drawing Sheet

U.S. PATENT DOCUMENTS

| | | | |
|---|---|---|---|
| 3,965,055 A | 6/1976 | Shichman et al. | 260/3 |
| 3,989,568 A | 11/1976 | Isaac | 156/182 |
| 3,992,014 A | 11/1976 | Retford | 273/218 |
| 4,033,900 A | 7/1977 | Hargis et al. | 252/431 L |
| 4,062,825 A | 12/1977 | Watabe et al. | 260/37 N |
| 4,123,061 A | 10/1978 | Dusbiber | 273/220 |
| 4,144,223 A | 3/1979 | Kent | 260/42.47 |
| 4,203,941 A | 5/1980 | Brooker | 264/250 |
| 4,310,582 A | 1/1982 | Stumpe, Jr. | 428/182 |
| 4,431,193 A | 2/1984 | Nesbitt | 273/235 |
| 4,499,239 A | 2/1985 | Murakami et al. | 525/111 |
| 4,625,964 A | 12/1986 | Yamada | 273/62 |
| 4,650,193 A | 3/1987 | Molitor et al. | 273/228 |
| 4,683,257 A | 7/1987 | Kakiuchi et al. | 524/432 |
| 4,692,497 A | 9/1987 | Gendreau et al. | 525/263 |
| 4,848,770 A | 7/1989 | Shama | 273/228 |
| 4,858,924 A | 8/1989 | Saito et al. | 273/62 |
| 4,914,152 A | 4/1990 | Miyashita et al. | 525/68 |
| 4,919,434 A | 4/1990 | Saito | 273/235 R |
| 4,929,678 A | 5/1990 | Hamada et al. | 525/193 |
| 4,931,376 A | 6/1990 | Ikematsu et al. | 526/164 |
| 4,959,000 A | 9/1990 | Giza | 425/116 |
| 4,968,752 A | 11/1990 | Kawamoto et al. | 525/194 |
| 4,971,329 A | 11/1990 | Llort et al. | 273/218 |
| 4,984,803 A | 1/1991 | Llort et al. | 273/235 R |
| 5,002,281 A | 3/1991 | Nakahara et al. | 273/220 |
| 5,006,288 A | 4/1991 | Rhodes et al. | 264/46.4 |
| 5,006,297 A | 4/1991 | Brown et al. | 264/234 |
| 5,017,636 A | 5/1991 | Hattori et al. | 524/300 |
| 5,025,059 A | 6/1991 | Mouri et al. | 524/495 |
| 5,037,104 A | 8/1991 | Watanabe et al. | 273/35 R |
| 5,072,944 A | 12/1991 | Nakahara et al. | 273/220 |
| 5,112,556 A | 5/1992 | Miller | 264/279 |
| 5,131,662 A | 7/1992 | Pollitt | 273/230 |
| 5,141,233 A | 8/1992 | Yuki et al. | 273/218 |
| 5,150,905 A | 9/1992 | Yuki et al. | 273/218 |
| 5,184,828 A | 2/1993 | Kim et al. | 273/228 |
| 5,252,652 A | 10/1993 | Egashira et al. | 524/392 |
| 5,253,871 A | 10/1993 | Viollaz | 273/228 |
| 5,314,187 A | 5/1994 | Proudfit | 273/235 R |
| 5,334,673 A | 8/1994 | Wu | 273/235 R |
| 5,415,937 A | 5/1995 | Cadomica et al. | 428/407 |
| 5,421,580 A | 6/1995 | Sugimoto et al. | 273/227 |
| 5,461,109 A | 10/1995 | Blair et al. | 524/839 |
| 5,484,870 A | 1/1996 | Wu | 528/28 |
| 5,494,958 A | 2/1996 | Freeman et al. | 524/505 |
| 5,496,496 A | 3/1996 | Kajita et al. | 252/182.24 |
| 5,543,467 A | 8/1996 | Hamada et al. | 525/207 |
| 5,553,852 A | 9/1996 | Higuchi et al. | 473/378 |
| 5,565,524 A | 10/1996 | Hamada et al. | 525/208 |
| 5,574,107 A | 11/1996 | Hiraoka et al. | 473/378 |
| 5,575,472 A | 11/1996 | Magerman et al. | 29/530 |
| 5,585,440 A | 12/1996 | Yamada et al. | 525/193 |
| 5,586,950 A | 12/1996 | Endo | 473/378 |
| 5,587,420 A | 12/1996 | Takizawa et al. | 524/572 |
| 5,589,546 A | 12/1996 | Hiraoka et al. | 525/193 |
| 5,609,535 A | 3/1997 | Morgan | 473/409 |
| 5,625,003 A | 4/1997 | Kato et al. | 525/208 |
| 5,663,235 A | 9/1997 | Tanaka | 525/201 |
| 5,688,191 A | 11/1997 | Cavallaro et al. | 473/373 |
| 5,692,974 A | 12/1997 | Wu et al. | 473/377 |
| 5,697,856 A | 12/1997 | Moriyama et al. | 473/374 |
| 5,704,852 A | 1/1998 | Kato | 473/357 |
| 5,716,293 A | 2/1998 | Yabuki et al. | 473/363 |
| 5,728,011 A | 3/1998 | Sugimoto et al. | 473/357 |
| 5,733,428 A | 3/1998 | Calabria et al. | 264/134 |
| 5,744,549 A | 4/1998 | Lutz | 525/129 |
| 5,759,676 A | 6/1998 | Cavallaro | 428/215 |
| 5,776,013 A | 7/1998 | Yokota | 473/377 |
| 5,779,561 A | 7/1998 | Sullivan et al. | 473/373 |
| 5,779,562 A | 7/1998 | Melvin | 473/373 |
| 5,803,831 A | 9/1998 | Sullivan et al. | 473/372 |
| 5,810,678 A | 9/1998 | Cavallaro | 473/373 |
| 5,813,923 A | 9/1998 | Cavallaro | 473/373 |
| 5,816,944 A | 10/1998 | Asakura et al. | 473/372 |
| 5,827,134 A | 10/1998 | Sullivan et al. | 473/372 |
| 5,833,553 A | 11/1998 | Sullivan et al. | 473/374 |
| 5,840,801 A | 11/1998 | Gardiner | 525/54.44 |
| 5,856,388 A | 1/1999 | Harris et al. | 524/320 |
| 5,859,153 A | 1/1999 | Kirk et al. | 525/481 |
| 5,861,465 A | 1/1999 | Hamada et al. | 525/332.6 |
| 5,885,172 A | 3/1999 | Hebert et al. | 473/354 |
| 5,885,173 A | 3/1999 | Keller | 473/385 |
| 5,888,437 A | 3/1999 | Calabria et al. | 264/135 |
| 5,899,822 A | 5/1999 | Yamagishi et al. | 473/374 |
| 5,902,855 A | 5/1999 | Sullivan | 525/221 |
| 5,908,358 A | 6/1999 | Wu | 473/378 |
| 5,919,101 A | 7/1999 | Yokota et al. | 473/374 |
| 5,929,171 A | 7/1999 | Sano et al. | 525/261 |
| 5,959,059 A | 9/1999 | Vedula et al. | 528/76 |
| 6,012,997 A | 1/2000 | Mason | 473/594 |
| 6,057,403 A | 5/2000 | Sullivan et al. | 525/221 |
| 6,117,024 A | 9/2000 | Dewanjee | 473/351 |
| 6,130,295 A | 10/2000 | Yokota | 525/221 |
| 6,139,447 A | 10/2000 | Ohama | 473/378 |
| 6,180,040 B1 | 1/2001 | Ladd et al. | 264/248 |
| 6,180,722 B1 | 1/2001 | Dalton et al. | 525/193 |
| 6,210,294 B1 * | 4/2001 | Wu | 473/377 |
| 6,315,684 B1 * | 11/2001 | Binette et al. | 473/377 |
| 6,325,730 B1 * | 12/2001 | Binette et al. | 473/377 |
| 6,325,731 B1 * | 12/2001 | Kennedy et al. | 473/377 |
| 6,394,913 B1 * | 5/2002 | Nesbitt et al. | 473/371 |
| 6,413,170 B1 * | 7/2002 | Binette et al. | 473/377 |
| 6,422,953 B1 * | 7/2002 | Nesbitt et al. | 473/376 |
| 6,486,261 B1 * | 11/2002 | Wu et al. | 525/332.6 |
| 6,517,451 B2 * | 2/2003 | Cavallaro et al. | 473/371 |

\* cited by examiner

INITIAL VELOCITY DUAL CORE GOLF BALL

CROSS-REFERENCE TO RELATED APPLICATIONS

This application is a continuation-in-part of co-pending U.S. application Ser. No. 09/782,782, filed Feb. 13, 2001, which is a continuation-in-part of co-pending application Ser. No. 09/274,015, filed Mar. 22, 1999, which is a continuation-in-part of U.S. application Ser. No. 08/863,788, filed May 27, 1997, now U.S. Pat. No. 5,885,172, and a continuation-in-part of co-pending application Ser. No. 09/721,740, filed Nov. 27, 2000, which is a continuation-in-part of co-pending application Ser. No. 09/311,591, filed May 14, 1999 now U.S. Pat. No. 6,210,294, and application Ser. No. 09/461,736, filed Dec. 16, 1999, each of which is incorporated herein in its entirety by reference.

FIELD OF THE INVENTION

This invention relates generally to golf balls, and more specifically, to multilayer golf balls. In particular, this invention relates to a golf ball having at least one core or cover layer comprising high-Mooney-viscosity regrind.

BACKGROUND OF THE INVENTION

There are a variety of different types of golf ball constructions, the majority of which, however, fall into two general categories: solid and wound golf balls. Solid golf balls include one-piece, two-piece, and multi-layer golf balls. One-piece golf balls are inexpensive and easy to construct, but have poor playing characteristics and are, therefore, usually limited for use as range balls. Two-piece balls are generally constructed with a polybutadiene solid core and a cover and are typically the most popular with recreational golfers because they are very durable and provide good distance. These balls are also relatively inexpensive and easy to manufacture, but are regarded by top players as having limited playing characteristics. Multi-layer golf balls are comprised of a solid core and a cover, either of which may be formed of one or more layers. These balls are regarded as having an extended range of playing characteristics, but are more expensive and difficult to manufacture than are one- and two-piece golf balls.

Wound golf balls, which typically include a fluid-filled center surrounded by tensioned elastomeric material and a cover, generally provide higher spin and soft "feel" characteristics but are more difficult and expensive to manufacture than are one-piece, two-piece, and multi-layer golf balls. Manufacturers are, therefore, constantly striving to produce a solid ball that incorporates the beneficial characteristics of a wound construction.

A variety of golf balls have been designed by manufacturers to provide a wide range of playing characteristics, such as compression, velocity, "feel," and spin. These characteristics can be adjusted and optimized for a variety of playing abilities. For example, manufacturers can adjust these properties by altering the materials (i.e., polymer compositions) and/or the physical construction of each or all of the various golf ball components (i.e., centers, cores, intermediate layers, and covers). Polymers commonly employed by manufacturers for the construction of golf balls include polybutadiene (cores), ionomers, such as SURLYN®, commercially available from DuPont (covers and intermediate layers), and polyurethanes (covers and intermediate layers). Finding the right combination of core and layer materials and construction to produce a golf ball suited for a predetermined set of performance criteria, in particular, increased resilience and, therefore, velocity, without a loss in "feel" is a task that is challenging.

It is desirable, therefore, to construct a ball having a soft, thin, urethane cover layer a harder, thin, ionomer inner cover layer, coupled with a polybutadiene center and an outer core layer, at least one of which contains high-Mooney-viscosity regrind, balata, or both. The present invention describes a variety of compositions and constructions employing high-Mooney-viscosity and balata, particularly in center and core layers, for increasing resiliency and improving processing of the material.

SUMMARY OF THE INVENTION

The present invention is directed to a golf ball comprising a core and a cover layer, wherein the core has an outer diameter of no greater than about 1.62 inches; the cover layer comprises an inner cover layer and an outer cover layer having a material hardness of less than about 60 Shore D; and at least one of the core or the cover includes high-Mooney-viscosity rubber, high-Mooney-viscosity rubber regrind, or a mixture thereof.

In one embodiment, the core comprises a center and at least one outer core layer. The high-Mooney-viscosity rubber or regrind should have a Mooney viscosity of between about 40 and about 80 and, preferably, between about 45 and about 60.

The high-Mooney-viscosity rubber regrind is present in an amount of no greater than about 20 weight percent of the total polymer composition and, more preferably, between about 5 weight percent and about 20 weight percent and, most preferably, in an amount of between about 8 weight percent and about 16 weight percent.

The core outer diameter is from 1.4 inches to about 1.62 inches and, in another embodiment, the outer core layer has an outer diameter from about 1.4 inches to about 1.62 inches. At least one of the cover layers comprises a polyurethane composition comprising the reaction product of at least one polyisocyanate, a polyol, and at least one curing agent and, additionally, at least one of the center or the outer core layer comprise high-Mooney-viscosity rubber regrind. In a preferred embodiment, the outer core layer comprises high-Mooney-viscosity rubber regrind.

The inner cover layer has a material hardness less than about 72 Shore D and, preferably, less than about 68 Shore D. At least one of the inner or outer cover layers includes ionic copolymers of ethylene and an unsaturated monocarboxylic acid; vinyl resins; polyolefins; polyurethanes; polyureas; polyamides; thermoplastic and thermoset resins; metallocenes; acrylic resins; thermoplastic polyesters; nonionic copolymers and terpolymers; or a mixture thereof.

At least one of the core or cover layers are cast, reaction injection molded, liquid injection molded, injection molded, or a combination thereof. In an alternative embodiment, the core has a moment of inertia of less than about 83 and a center deflection of greater than about 4.5 mm under a load of 100 Kg. The outer cover layer also can have a material hardness of less than about 58.

The present invention is also directed to a golf ball comprising a core and a cover layer, wherein the core comprises a solid center and an outer core layer and has an outer diameter of less than about 1.62 inches; the cover layer comprises an inner cover layer and an outer cover layer, the outer cover having a material hardness of no greater than about 58 Shore D; and wherein at least one of the core or outer core layer comprises a mold assisting blend including high-Mooney-viscosity rubber, high-Mooney-viscosity rubber regrind, and balata.

The present invention is further directed to a golf ball comprising a core and a cover layer, wherein the core comprises a solid center and an outer core layer and has an outer diameter of between about 1.4 and about 1.62 inches; the cover layer comprises an inner cover layer and an outer cover layer, the outer cover having a material hardness of no greater than about 58 Shore D, and the inner cover layer has a material hardness of less than about 72; and wherein the outer core layer comprises a mold assisting blend comprising high-Mooney-viscosity rubber, high-Mooney-viscosity rubber regrind, and balata.

DEFINITIONS

Figure 1:
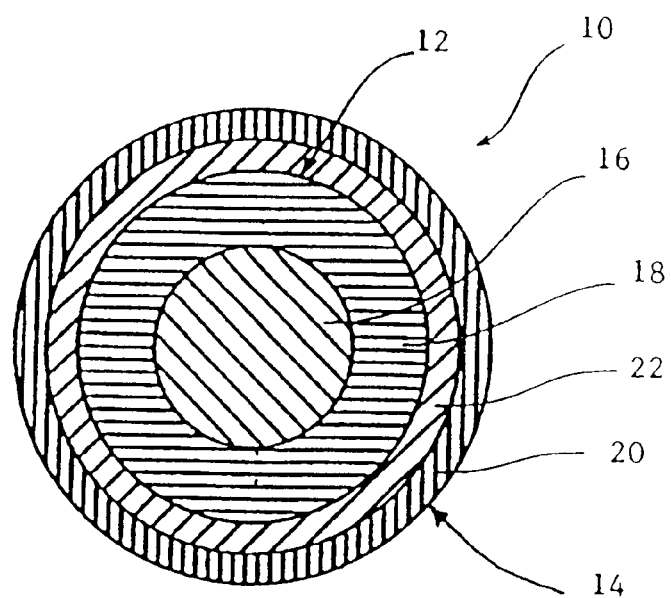
FIG. 1 is a cross-sectional view of a golf ball having a dual cover and a dual core according to the invention.

The term "about," as used herein in connection with one or more numbers or numerical ranges, should be understood to refer to all such numbers, including all numbers in a range.

As used herein, "cis-to-trans catalyst" means any component or a combination thereof that will convert at least a portion of cis-polybutadiene isomer to trans-polybutadiene isomer at a given temperature. It should be understood that the combination of the cis-isomer, the trans-isomer, and any vinyl-isomer, measured at any given time, comprises 100 percent of the polybutadiene.

As used herein, the term "active ingredients" is defined as the specific components of a mixture or blend that are essential to the chemical reaction.

As used herein, substituted and unsubstituted "aryl" groups means a hydrocarbon ring bearing a system of conjugated double bonds, typically comprising $4n+2\pi$ ring electrons, where n is an integer. Examples of aryl groups include, but are not limited to phenyl, naphthyl, anisyl, tolyl, xylenyl and the like. According to the present invention, aryl also includes heteroaryl groups, e.g., pyrimidine or thiophene. These aryl groups may also be substituted with any number of a variety of functional groups. In addition to the functional groups described herein in connection with carbocyclic groups, functional groups on the aryl groups can include hydroxy and metal salts thereof; mercapto and metal salts thereof; halogen; amino, nitro, cyano, and amido; carboxyl including esters, acids, and metal salts thereof; silyl; acrylates and metal salts thereof; sulfonyl or sulfonamide; and phosphates and phosphites; and a combination thereof.

As used herein, the term "Atti compression" is defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball. When the Atti Gauge is used to measure cores having a diameter of less than 1.680 in, it should be understood that a metallic or other suitable shim is used to make the diameter of the measured object 1.680 in. As used herein, substituted and unsubstituted "carbocyclic" means cyclic carbon-containing compounds, including, but not limited to cyclopentyl, cyclohexyl, cycloheptyl, adamantyl, and the like. Such cyclic groups may also contain various substituents in which one or more hydrogen atoms has been replaced by a functional group. Such functional groups include those described above, and lower alkyl groups having from 1–28 carbon atoms. The cyclic groups of the invention may further comprise a heteroatom.

As used herein, the term "coefficient of restitution" for golf balls is defined as the ratio of the rebound velocity to the inbound velocity when balls are fired into a rigid plate. The inbound velocity is understood to be 125 ft/s.

As used herein, the terms "Group VIA component" or "Group VIA element" mean a component that includes a sulfur component, a selenium component, or a tellurium component, or a combination thereof.

As used herein, the term "sulfur component" means a component that is elemental sulfur, polymeric sulfur, or a combination thereof. It should be further understood that "elemental sulfur" refers to the ring structure of S8 and that "polymeric sulfur" is a structure including at least one additional sulfur relative to the elemental sulfur.

As used herein, the term "fluid" includes a liquid, a paste, a gel, a gas, or any combination thereof.

As used herein, the term "molecular weight" is defined as the absolute weight average molecular weight. The molecular weight is determined by the following method: approximately 20 mg of polymer is dissolved in 10 mL of tetrahydrofuran ("THF"), which may take a few days at room temperature depending on the polymer's molecular weight and distribution. One liter of THF is filtered and degassed before being placed in a high-performance liquid chromatography ("HPLC") reservoir. The flow rate of the HPLC is set to 1 mL/min through a Viscogel column. This nonshedding, mixed bed, column model GMHHR-H, which has an ID of 7.8 mm and 300 mm long is available from Viscotek Corp. of Houston, Tex. The THF flow rate is set to 1 mL/min for at least one hour before sample analysis is begun or until stable detector baselines are achieved. During this purging of the column and detector, the internal temperature of the Viscotek TDA Model 300 triple detector should be set to 40° C. This detector is also available from Viscotek Corp. The three detectors (i.e., Refractive Index, Differential Pressure, and Light Scattering) and the column should be brought to thermal equilibrium, and the detectors should be purged and zeroed, to prepare the system for calibration according to the instructions provided with this equipment. A 100-$\mu$L aliquot of sample solution can then be injected into the equipment and the molecular weight of each sample can be calculated with the Viscotek's triple detector software. When the molecular weight of the polybutadiene material is measured, a dn/dc of 0.130 should always be used. It should be understood that this equipment and these methods provide the molecular weight numbers described and claimed herein, and that other equipment or methods will not necessarily provide equivalent values as used herein.

As used herein, the term "multilayer" means at least two layers and includes liquid center balls, wound balls, hollow-center balls, and balls with at least two intermediate layers and/or an inner or outer cover.

As used herein, the term "thermoset" material refers to an irreversible, solid polymer that is the product of the reaction of two or more prepolymer precursor materials.

As used herein, the term "parts per hundred," also known as "phr," is defined as the number of parts by weight of a particular component present in a mixture, relative to 100 parts by weight of the total polymer component. Mathematically, this can be expressed as the weight of an ingredient divided by the total weight of the polymer, multiplied by a factor of 100.

As used herein, the term "substantially free" means less than about 5 weight percent, preferably less than about 3 weight percent, more preferably less than about 1 weight percent, and most preferably less than about 0.01 weight percent.

As used herein the term "resilience index" is defined as the difference in loss tangent measured at 10 cpm and 1000 cpm divided by 990 (the frequency span) multiplied by 100,000 (for normalization and unit convenience). The loss tangent is measured using an RPA 2000 manufactured by Alpha Technologies of Akron, Ohio. The RPA 2000 is set to sweep from 2.5 to 1000 cpm at a temperature of 100° C. using an arc of 0.5 degrees. An average of six loss tangent measurements were acquired at each frequency and the average is used in calculation of the resilience index. The computation of resilience index is as follows:

Resilience Index=100,000·[(loss tangent@10 cpm)−(loss tangent@1000 cpm)]/990

DETAILED DESCRIPTION OF THE INVENTION

The golf ball cores of the present invention may comprise any of a variety of constructions. For example, the core of the golf ball may comprise a conventional center surrounded by an intermediate mantle or outer core layer disposed between the center and the inner cover layer. The core may be a single layer or may comprise a plurality of layers. The innermost portion of the core may be solid or it may be a liquid filled sphere. As with the core, the intermediate mantle or outer core layer may also comprise a plurality of layers. The core may also comprise a solid or liquid filled center around which many yards of a tensioned elastomeric material are wound.

Referring to FIG. 1, preferably the golf ball 10 of the present invention includes a core 12 and a cover 14 surrounding the core 12. The core 12 preferably comprises a center 16 and an outer core layer 18, and the cover 14 comprises an outer cover layer 20 and an inner cover layer 22.

The materials for solid cores include compositions having a base rubber, a crosslinking agent, a filler, and a co-crosslinking or initiator agent. The base rubber typically includes natural or synthetic rubbers. A preferred base rubber is 1,4-polybutadiene having a cis-structure of at least 40%. Most preferably, the base rubber comprises high-Mooney-viscosity rubber. If desired, the polybutadiene can also be mixed with other elastomers known in the art such as natural rubber, polyisoprene rubber (also know as balata) and/or styrene-butadiene rubber in order to modify the properties of the core.

The crosslinking agent includes a metal salt of an unsaturated fatty acid such as a zinc salt or a magnesium salt of an unsaturated fatty acid having 3 to 8 carbon atoms such as acrylic or methacrylic acid. Suitable cross linking agents include metal salt diacrylates, dimethacrylates and monomethacrylates wherein the metal is magnesium, calcium, zinc, aluminum, sodium, lithium or nickel.

One embodiment of the present invention relates to a multi-layer golf ball having a core comprising a solid center surrounded by at least one additional solid outer core layer. At least one of the outer core layers is formed of a resilient rubber-based component comprising a high-Mooney-viscosity rubber, and a crosslinking agent present in an amount from about 20 to about 40 parts per hundred, from about 30 to about 38 parts per hundred, and most preferably about 37 parts per hundred. It should be understood that the term "parts per hundred" is with reference to the rubber by weight.

The center of the ball is preferably solid having a resilient high-Mooney-viscosity rubber component, and a crosslinking agent present in an amount from about 15 to about 30 parts per hundred of the rubber, preferably in an amount from about 19 to about 25 parts per hundred of the rubber and most preferably having about 20 to 24 parts crosslinking agent per hundred of rubber.

The initiator agent can be any known polymerization initiator which decomposes during the cure cycle. Suitable initiators include peroxide compounds such as dicumyl peroxide, 1,1-di(t-butylperoxy) 3,3,5-trimethyl cyclohexane, a-a bis(t-butylperoxy)diisopropylbenzene, 2,5-dimethyl-2,5 di(t-butylperoxy)hexane or di-t-butyl peroxide and mixtures thereof.

As used herein, the term "filler" includes any compound or composition that can be used to vary the density and other properties of the core. Fillers typically include materials such as tungsten, zinc oxide, barium sulfate, silica, calcium carbonate, zinc carbonate regrind (recycled core material ground to 30 mesh particle), high-Mooney-viscosity rubber regrind, and the like.

When regrind, and preferably high-Mooney-viscosity rubber regrind, is used in the cores, centers, and intermediate layers of the golf ball, the regrind is typically present in an amount of no greater than about 20 percent by weight of the total polymer composition, more preferably, between about 5 and about 20 weight percent, and most preferably, between about 8 and about 16 weight percent. Is it most preferred that the high-Mooney-viscosity rubber regrind be used in golf ball centers and core or intermediate layers.

The present invention also relates to multilayer golf balls having a core and a cover, such as a solid, hollow, or fluid-filled center, an outer core layer, and an inner and outer cover layer, disposed about the center. At least one of the center or intermediate layers includes a reaction product that includes a cis-to-trans catalyst, a resilient polymer component having polybutadiene, a free radical source, and optionally, a crosslinking agent, a filler, or both.

The invention also includes a method to convert the cis-isomer of the polybutadiene resilient polymer component to the trans-isomer during a molding cycle and to form a golf ball. A variety of methods and materials have been disclosed in U.S. Pat. No. 6,162,135 and U.S. application Ser. No. 09/461,736, filed Dec. 16, 1999; Ser. No. 09/458,676, filed Dec. 10, 1999; and Ser. No. 09/461,421, filed Dec. 16, 1999, each of which are incorporated herein, in their entirety, by reference. Various combinations of polymers, cis-to-trans catalysts, fillers, crosslinkers, and a source of free radicals, may be used. To obtain a higher resilience and lower compression center or intermediate layer, a high-molecular weight polybutadiene with a cis-isomer content preferably greater than about 90 percent is converted to increase the percentage of trans-isomer content at any point in the golf ball or portion thereof, preferably to increase the percentage throughout substantially all of the golf ball or portion thereof, during the molding cycle. More preferably, the cis-polybutadiene isomer is present in an amount of greater than about 95 percent of the total polybutadiene content. Without wishing to be bound by any particular theory, it is believed that a low amount of 1,2-polybutadiene isomer ("vinyl-polybutadiene") is desired in the initial polybutadiene, and the reaction product. Preferably, the vinyl polybutadiene isomer content is less than about 7 percent. More preferably, the vinyl polybutadiene isomer content is less than about 4 percent. Most preferably, the vinyl polybutadiene isomer content is less than about 2 percent. Without wishing to be bound by any particular theory, it is also believed that the resulting mobility of the combined cis- and trans-polybutadiene backbone is responsible for the lower modulus and higher resilience of the reaction product and golf balls including the same.

Crosslinkers are included to increase the hardness of the reaction product. Suitable crosslinking agents include one or more metallic salts of unsaturated fatty acids or monocarboxylic acids, such as zinc, calcium, or magnesium acrylate salts, and the like, and mixtures thereof. Preferred acrylates include zinc acrylate, zinc diacrylate, zinc methacrylate, and zinc dimethacrylate, and mixtures thereof. The crosslinking agent must be present in an amount sufficient to crosslink a portion of the chains of polymers in the resilient polymer component. For example, the desired compression may be obtained by adjusting the amount of crosslinking. This may be achieved, for example, by altering the type and amount of crosslinking agent, a method well-known to those of ordinary skill in the art. The crosslinking agent is typically present in an amount greater than about 10 phr of the polymer component, preferably from about 10 to 40 phr of the polymer component, more preferably from about 10 to 30 phr of the polymer component. When an organosulfur is selected as the cis-to-trans catalyst, zinc diacrylate may be selected as the crosslinking agent and is present in an amount of less than about 40 phr.

Fillers added to one or more portions of the golf ball typically include processing aids or compounds to affect rheological and mixing properties, density-modifying fillers, tear strength, or reinforcement fillers, and the like. The fillers are generally inorganic, and suitable fillers include numerous metals or metal oxides, such as zinc oxide and tin oxide, as well as barium sulfate, zinc sulfate, calcium carbonate, barium carbonate, clay, tungsten, tungsten carbide, an array of silicas, and mixtures thereof. Fillers may also include various foaming agents or blowing agents which may be readily selected by one of ordinary skill in the art. Fillers may include polymeric, ceramic, metal, and glass microspheres may be solid or hollow, and filled or unfilled. Fillers are typically also added to one or more portions of the golf ball to modify the density thereof to conform to uniform golf ball standards. Fillers may also be used to modify the weight of the center or at least one additional layer for specialty balls, e.g., a lower weight ball is preferred for a player having a low swing speed.

The polymers, free-radical initiator, filler(s), and any other materials used in forming either the golf ball center or any portion of the core, in accordance with the invention, may be combined to form a mixture by any type of mixing known to one of ordinary skill in the art. Suitable types of mixing include single pass and multi-pass mixing, and the like. The crosslinking agent, and any other optional additives used to modify the characteristics of the golf ball center or additional layer(s), may similarly be combined by any type of mixing. A single-pass mixing process where ingredients are added sequentially is preferred, as this type of mixing tends to increase efficiency and reduce costs for the process. The preferred mixing cycle is single step wherein the polymer, cis-to-trans catalyst, filler, zinc diacrylate, and peroxide are added sequentially. Suitable mixing equipment is well known to those of ordinary skill in the art, and such equipment may include a Banbury mixer, a two-roll mill, or a twin screw extruder.

Conventional mixing speeds for combining polymers are typically used, although the speed must be high enough to impart substantially uniform dispersion of the constituents. On the other hand, the speed should not be too high, as high mixing speeds tend to break down the polymers being mixed and particularly may undesirably decrease the molecular weight of the resilient polymer component. The speed should thus be low enough to avoid high shear, which may result in loss of desirably high molecular weight portions of the polymer component. Also, too high a mixing speed may undesirably result in creation of enough heat to initiate the crosslinking before the preforms are shaped and assembled around a core. The mixing temperature depends upon the type of polymer components, and more importantly, on the type of free-radical initiator. For example, when using di(2-t-butyl-peroxyisopropyl)benzene as the free-radical initiator, a mixing temperature of about 80° C. to 125° C., preferably about 88° C. to 110° C., and more preferably about 90° C. to 100° C., is suitable to safely mix the ingredients. Additionally, it is important to maintain a mixing temperature below the peroxide decomposition temperature. For example, if dicumyl peroxide is selected as the peroxide, the temperature should not exceed 200° F. Suitable mixing speeds and temperatures are well-known to those of ordinary skill in the art, or may be readily determined without undue experimentation.

The mixture can be subjected to, e.g., a compression or injection molding process, to obtain solid spheres for the center or hemispherical shells for forming an intermediate layer. The polymer mixture is subjected to a molding cycle in which heat and pressure are applied while the mixture is confined within a mold. The cavity shape depends on the portion of the golf ball being formed. The compression and heat liberates free radicals by decomposing one or more peroxides, which may initiate the cis-to-trans conversion and crosslinking simultaneously. The temperature and duration of the molding cycle are selected based upon the type of peroxide and cis-trans catalyst selected. The molding cycle may have a single step of molding the mixture at a single temperature for a fixed time duration. An example of a single step molding cycle, for a mixture that contains dicumyl peroxide, would hold the polymer mixture at 340° F. for a duration of 15 minutes. The molding cycle may also include a two-step process, in which the polymer mixture is held in the mold at an initial temperature for an initial duration of time, followed by holding at a second, typically higher temperature for a second duration of time. An example of a two-step molding cycle would be holding the mold at 290° F. for 40 minutes, then ramping the mold to 340° F. where it is held for a duration of 20 minutes. In a preferred embodiment of the current invention, a single-step cure cycle is employed. Single-step processes are effective and efficient, reducing the time and cost of a two-step process. The resilient polymer component, polybutadiene, cis-to-trans conversion catalyst, additional polymers, free-radical initiator, filler, and any other materials used in forming either the golf ball center or any portion of the core, in accordance with the invention, may be combined to form a golf ball by an injection molding process, which is also well-known to one of ordinary skill in the art. Although the curing time depends on the various materials selected, a particularly suitable curing time is about 5 to 18 minutes, preferably from about 8 to 15 minutes, and more preferably from about 10 to 12 minutes. Those of ordinary skill in the art will be readily able to adjust the curing time upward or downward based on the particular materials used and the discussion herein.

The cured resilient polymer component, which contains a greater amount of trans-polybutadiene than the uncured resilient polymer component, is formed into an article having a first hardness at a point in the interior and a surface having a second hardness such that the second hardness differs from the first hardness by greater than 10 percent of the first hardness. Preferably, the article is a sphere and the point is the midpoint of the article. In another embodiment, the second hardness differs from the first by greater than 20 percent of the first hardness. The cured article also has a first amount of trans-polybutadiene at an interior location and a second amount of trans-polybutadiene at a surface location, wherein the first amount is at least about 6 percent less than the second amount, preferably at least about 10 percent less than the second amount, and more preferably at least about 20 percent less than the second amount. The interior location is preferably a midpoint and the article is preferably a sphere. The compression of the core, or portion of the core, of golf balls prepared according to the invention is preferably below about 50, more preferably below about 25.

The cover provides the interface between the ball and a club. Properties that are desirable for the cover are good moldability, high abrasion resistance, high tear strength, high resilience, and good mold release, among others. The cover typically has a thickness to provide sufficient strength, good performance characteristics and durability. The cover preferably has a thickness of less than about 0.1 in, more preferably, less than about 0.05 in, and most preferably, between about 0.02 and about 0.04 in. The invention is particularly directed towards a multilayer golf ball which comprises a core, an inner cover layer, and an outer cover layer. In this embodiment, preferably, at least one of the inner and outer cover layers has a thickness of less than about 0.05 in, more preferably between about 0.02 in and about 0.04 in. Most preferably, the thickness of either layer is about 0.03 in.

When the golf ball of the present invention includes an intermediate layer, such as an inner cover layer, this layer can include any materials known to those of ordinary skill in the art, including thermoplastic and thermosetting materials, but preferably the intermediate layer can include any suitable materials, such as ionic copolymers of ethylene and an unsaturated monocarboxylic acid which are available under the trademark SURLYN® of E. I. DuPont de Nemours & Co., of Wilmington, Del., or IOTEK® or ESCOR® of Exxon. These are copolymers or terpolymers of ethylene and methacrylic acid or acrylic acid partially neutralized with salts of zinc, sodium, lithium, magnesium, potassium, calcium, manganese, nickel or the like, in which the salts are the reaction product of an olefin having from 2 to 8 carbon atoms and an unsaturated monocarboxylic acid having 3 to 8 carbon atoms. The carboxylic acid groups of the copolymer may be totally or partially neutralized and might include methacrylic, crotonic, maleic, fumaric or itaconic acid.

This golf ball can likewise include one or more homopolymeric or copolymeric inner cover layer materials, such as:

(1) Vinyl resins, such as those formed by the polymerization of vinyl chloride, or by the copolymerization of vinyl chloride with vinyl acetate, acrylic esters or vinylidene chloride;

(2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst or a metallocene catalyst;

(3) Polyurethanes, such as those prepared from polyols and diisocyanates or polyisocyanates and those disclosed in U.S. Pat. No. 5,334,673;

(4) Polyureas, such as those disclosed in U.S. Pat. No. 5,484,870;

(5) Polyamides, such as poly(hexamethylene adipamide) and others prepared from diamines and dibasic acids, as well as those from amino acids such as poly (caprolactam), and blends of polyamides with SURLYN®, polyethylene, ethylene copolymers, ethyl-propylene-non-conjugated diene terpolymer, and the like;

(6) Acrylic resins and blends of these resins with poly vinyl chloride, elastomers, and the like;

(7) Thermoplastics, such as urethanes; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX®, sold by ELF Atochem of Philadelphia, Pa.;

(8) Polyphenylene oxide resins or blends of polyphenylene oxide with high impact polystyrene as sold under the trademark NORYL® by General Electric Company of Pittsfield, Mass.;

(9) Thermoplastic polyesters, such as polyethylene terephthalate, polybutylene terephthalate, polyethylene terephthalate/glycol modified and elastomers sold under the trademarks HYTREL® by E. I. DuPont de Nemours & Co. of Wilmington, Del., and LOMOD® by General Electric Company of Pittsfield, Mass.;

(10) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and

(11) Blends of thermoplastic rubbers with polyethylene, propylene, polyacetal, nylon, polyesters, cellulose esters, and the like.

Preferably, the optional intermediate layer includes polymers, such as ethylene, propylene, butene-1 or hexane-1 based homopolymers or copolymers including functional monomers, such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(ethelyne vinyl alcohol), poly(tetrafluoroethylene) and their copolymers including functional comonomers, and blends thereof. Suitable cover compositions also include a polyether or polyester thermoplastic urethane, a thermoset polyurethane, a low modulus ionomer, such as acid-containing ethylene copolymer ionomers, including E/X/Y terpolymers where E is ethylene, X is an acrylate or methacrylate-based softening comonomer present in about 0 to 50 weight percent and Y is acrylic or methacrylic acid present in about 5 to 35 weight percent. More preferably, in a low spin rate embodiment designed for maximum distance, the acrylic or methacrylic acid is present in about 16 to 35 weight percent, making the ionomer a high modulus ionomer. In a higher spin embodiment, the inner cover layer includes an ionomer where an acid is present in about 10 to 15 weight percent and includes a softening comonomer.

The cover may include any of the above material but preferably includes a saturated (aliphatic) or unsaturated polyurethane composition comprising the reaction product of at least one polyisocyanate, polyol, and at least one curing agent.

Any polyisocyanate available to one of ordinary skill in the art is suitable for use according to the invention. Exemplary polyisocyanates include, but are not limited to, 4,4'-diphenylmethane diisocyanate ("MDI"), polymeric MDI, carbodiimide-modified liquid MDI, 4,4'-dicyclohexylmethane diisocyanate ("$H_{12}MDI$"), p-phenylene diisocyanate ("PPDI"), toluene diisocyanate ("TDI"), 3,3'-dimethyl-4,4'-biphenylene diisocyanate ("TODI"), isophoronediisocyanate ("IPDI"), hexamethylene diisocyanate ("HDI"), naphthalene diisocyanate ("NDI"); xylene diisocyanate ("XDI"); para-tetramethylxylene diisocyanate ("p-TMXDI"); meta-tetramethylxylene diisocyanate ("m-TMXDI"); ethylene diisocyanate; propylene-1,2-diisocyanate; tetramethylene-1,4-diisocyanate; cyclohexyl diisocyanate; 1,6-hexamethylene-diisocyanate ("HDI"); dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"), tetracene diisocyanate, napthalene diisocyanate, anthracene diisocyanate, and mixtures thereof. Polyisocyanates are known to those of ordinary skill in the art as having more than one isocyanate group, e.g., di-, tri-, and tetra-isocyanate. Preferably, the polyisocyanate includes MDI, PPDI, TDI, or a mixture thereof, and more preferably, the polyisocyanate includes MDI. It should be understood that, as used herein, the term MDI includes 4,4'-diphenylmethane diisocyanate, polymeric MDI, carbodiimide-modified liquid MDI, and mixtures thereof and, additionally, that the diisocyanate employed may be "low free monomer," understood by one of ordinary skill in the art to have lower levels of "free" monomer isocyanate groups, typically less than about 0.1% free monomer groups. Examples of "low free monomer" diisocyanates include, but are not limited to Low Free Monomer MDI, Low Free Monomer TDI, and Low Free Monomer PPDI.

The at least one polyisocyanate should have less than about 14% unreacted NCO groups. Preferably, the at least one polyisocyanate has no greater than about 7.5% NCO, and more preferably, less than about 7.0%.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol ("PTMEG"), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

In another embodiment, polyester polyols are included in the polyurethane material of the invention. Suitable polyester polyols include, but are not limited to, polyethylene adipate glycol, polybutylene adipate glycol, polyethylene propylene adipate glycol, ortho-phthalate-1,6-hexanediol, and mixtures thereof. The hydrocarbon chain can have saturated or unsaturated bonds, or substituted or unsubstituted aromatic and cyclic groups.

In another embodiment, polycaprolactone polyols are included in the materials of the invention. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups.

In yet another embodiment, the polycarbonate polyols are included in the polyurethane material of the invention. Suitable polycarbonates include, but are not limited to, polyphthalate carbonate. The hydrocarbon chain can have saturated or unsaturated bonds, or substituted or unsubstituted aromatic and cyclic groups. In one embodiment, the molecular weight of the polyol is from about 200 to about 4000.

Polyamine curatives are also suitable for use in the polyurethane composition of the invention and have been found to improve cut, shear, and impact resistance of the resultant balls. Preferred polyamine curatives include, but are not limited to, 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); polytetramethyleneoxide-di-p-aminobenzoate; N,N'-dialkyldiamino diphenyl methane; p,p'-methylene dianiline ("MDA"); m-phenylenediamine ("MPDA"); 4,4'-methylene-bis-(2-chloroaniline) ("MOCA"); 4,4'-methylene-bis-(2,6-diethylaniline); 4,4'-diamino-3,3'-diethyl-5,5'-dimethyl diphenylmethane; 2,2',3,3'-tetrachloro diamino diphenylmethane; 4,4'-methylene-bis-(3-chloro-2,6-diethylaniline); trimethylene glycol di-p-aminobenzoate; and mixtures thereof. Preferably, the curing agent of the present invention includes 3,5-dimethylthio-2,4-toluenediamine and isomers thereof, such as ETHACURE 300, commercially available from Albermarle Corporation of Baton Rouge, La. Suitable polyamine curatives, which include both primary and secondary amines, preferably have molecular weights ranging from about 64 to about 2000.

At least one of a diol, triol, tetraol, or hydroxy-terminated curatives may be added to the aforementioned polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy) benzene; 1,3-bis-[2-(2-hydroxy)ethoxy] benzene; 1,3-bis-{2-[2-(2-hydroxyethoxy)ethoxy] ethoxy}benzene; 1,4-butanediol; 1,5-pentanediol; 1,6-hexanediol; resorcinol-di-($\beta$-hydroxyethyl)ether; hydroquinone-di-($\beta$-hydroxyethyl)ether; and mixtures thereof. Preferred hydroxy-terminated curatives include ethylene glycol; diethylene glycol; 1,4-butanediol; 1,5-pentanediol; 1,6-hexanediol, trimethylol propane, and mixtures thereof. Preferably, the hydroxy-terminated curatives have molecular weights ranging from about 48 to 2000. It should be understood that molecular weight, as used herein, is the absolute weight average molecular weight and would be understood as such by one of ordinary skill in the art.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

Any method known to one of ordinary skill in the art may be used to combine the polyisocyanate, polyol, and curing agent of the present invention. One commonly employed method, known in the art as a one-shot method, involves concurrent mixing of the polyisocyanate, polyol, and curing agent. This method results in a mixture that is inhomogenous (more random) and affords the manufacturer less control over the molecular structure of the resultant composition. A preferred method of mixing is known as a prepolymer method. In this method, the polyisocyanate and the polyol are mixed separately prior to addition of the curing agent. This method affords a more homogeneous mixture resulting in a more consistent polymer composition.

An optional filler component may be chosen to impart additional density to blends of the previously described components. The selection of such filler(s) is dependent upon the type of golf ball desired (i.e., one-piece, two-piece multi-component, or wound). Examples of useful fillers include zinc oxide, barium sulfate, calcium oxide, calcium carbonate and silica, as well as the other well known corresponding salts and oxides thereof. Additives, such as nanoparticles, glass spheres, and various metals, such as titanium and tungsten, can be added to the polyurethane compositions of the present invention, in amounts as needed, for their well-known purposes. Additional components which can be added to the polyurethane composition include UV stabilizers and other dyes, as well as optical brighteners and fluorescent pigments and dyes. Such additional ingredients may be added in any amounts that will achieve their desired purpose. Due to the very thin nature, it has been found by the present invention that the use of a castable, reactive material, which is applied in a fluid form, makes it possible to obtain very thin outer cover layers on golf balls. Specifically, it has been found that castable, reactive liquids, which react to form a urethane elastomer material, provide desirable very thin outer cover layers.

The castable, reactive liquid employed to form the urethane elastomer material can be applied over the inner core using a variety of application techniques such as spraying, dipping, spin coating, or flow coating methods which are well known in the art. An example of a suitable coating technique is that which is disclosed in U.S. Pat. No. 5,733,428, the disclosure of which is hereby incorporated by reference in its entirety in the present application.

The cover is preferably formed around the inner cover layer by mixing and introducing the material in the mold halves. It is important that the viscosity be measured over time, so that the subsequent steps of filling each mold half, introducing the core into one half and closing the mold can be properly timed for accomplishing centering of the core cover halves fusion and achieving overall uniformity. Suitable viscosity range of the curing urethane mix for introducing cores into the mold halves is determined to be approximately between about 2,000 cP and about 30,000 cP, with the preferred range of about 8,000 cP to about 15,000 cP.

To start the cover formation, mixing of the prepolymer and curative is accomplished in motorized mixer including mixing head by feeding through lines metered amounts of curative and prepolymer. Top preheated mold halves are filled and placed in fixture units using pins moving into holes in each mold. After the reacting materials have resided in top mold halves for about 40 to about 80 seconds, a core is lowered at a controlled speed into the gelling reacting mixture. At a later time, a bottom mold half or a series of bottom mold halves have similar mixture amounts introduced into the cavity.

A ball cup holds the ball core through reduced pressure (or partial vacuum) in hose. Upon location of the coated core in the halves of the mold after gelling for about 40 to about 80 seconds, the vacuum is released allowing core to be released. The mold halves, with core and solidified cover half thereon, are removed from the centering fixture unit, inverted and mated with other mold halves which, at an appropriate time earlier, have had a selected quantity of reacting polyurethane prepolymer and curing agent introduced therein to commence gelling.

Similarly, U.S. Pat. Nos. 5,006,297 and 5,334,673 both also disclose suitable molding techniques which may be utilized to apply the castable reactive liquids employed in the present invention. Further, U.S. Pat. Nos. 6,180,040 and 6,180,722 disclose methods of preparing dual core golf balls. The disclosures of these patents are hereby incorporated by reference in their entirety. However, the method of the invention is not limited to the use of these techniques.

Depending on the desired properties, balls prepared according to the invention can exhibit substantially the same or higher resilience, or coefficient of restitution ("COR"), with a decrease in compression or modulus, compared to balls of conventional construction. Additionally, balls prepared according to the invention can also exhibit substantially higher resilience, or COR, without an increase in compression, compared to balls of conventional construction. Another measure of this resilience is the "loss tangent," or tan δ, which is obtained when measuring the dynamic stiffness of an object. Loss tangent and terminology relating to such dynamic properties is typically described according to ASTM D4092-90. Thus, a lower loss tangent indicates a higher resiliency, thereby indicating a higher rebound capacity. Low loss tangent indicates that most of the energy imparted to a golf ball from the club is converted to dynamic energy, i. e., launch velocity and resulting longer distance. The rigidity or compressive stiffness of a golf ball may be measured, for example, by the dynamic stiffness. A higher dynamic stiffness indicates a higher compressive stiffness. To produce golf balls having a desirable compressive stiffness, the dynamic stiffness of the crosslinked reaction product material should be less than about 50,000 N/m at −50° C. Preferably, the dynamic stiffness should be between about 10,000 and 40,000 N/m at −50° C., more preferably, the dynamic stiffness should be between about 20,000 and 30,000 N/m at −50° C.

The resultant golf balls typically have a coefficient of restitution of greater than about 0.7, preferably greater than about 0.75, and more preferably greater than about 0.78. The golf balls also typically have an Atti compression of at least about 40, preferably from about 50 to 120, and more preferably from about 60 to 100. The golf ball polybutadiene material of the present invention typically has a flexural modulus of from about 500 psi to 300,000 psi, preferably from about 2000 to 200,000 psi. The golf ball polybutadiene material typically has a hardness of at least about 15 Shore A, preferably between about 30 Shore A and 80 Shore D, more preferably between about 50 Shore A and 60 Shore D.

The specific gravity of the center composition is typically greater than about 0.7 and preferably greater than about 1.0. The center and the outer core layer may have the same or different specific gravity values. In one embodiment, the center and outer core layer have different specific gravity values. It is preferred, however, that the specific gravity of the outer core layer and the center differ by less than 0.1.

The center composition should comprise at least one rubber material having a resilience index of at least about 40. Preferably the resilience index is at least about 50. Polymers that produce resilient golf balls and, therefore, are suitable for the present invention, include but are not limited to CB23, CB22, BR60, and 1207G. To clarify the method of computation for resilience index, the resilience index for CB23, for example, is computed as follows:

Resilience Index for CB23=100,000·[(0.954)−(0.407)]/990

Resilience Index for CB23=55

The molding process and composition of golf ball portions typically results in a gradient of material properties. Methods employed in the prior art generally exploit hardness to quantify these gradients. Hardness is a qualitative measure of static modulus and does not represent the modulus of the material at the deformation rates associated with golf ball use, i.e., impact by a club. As is well known to one skilled in the art of polymer science, the time-temperature superposition principle may be used to emulate alternative deformation rates. For golf ball portions including polybutadiene, a 1-Hz oscillation at temperatures between 0° C. and −50° C. are believed to be qualitatively equivalent to golf ball impact rates. Therefore, measurement of loss tangent and dynamic stiffness at 0° C. to −50° C. may be used to accurately anticipate golf ball performance, preferably at temperatures between about −20° C. and −50° C.

Additionally, the unvulcanized rubber, such as polybutadiene, in golf balls prepared according to the invention typically has a Mooney viscosity of between about 40 and about 80, more preferably, between about 45 and about 60, and most preferably, between about 45 and about 55. Mooney viscosity is typically measured according to ASTM D-1646.

When golf balls are prepared according to the invention, they typically will have dimple coverage greater than about 60 percent, preferably greater than about 65 percent, and more preferably greater than about 75 percent. The flexural modulus of the cover on the golf balls, as measured by ASTM method D6272-98, Procedure B, is typically greater than about 500 psi, and is preferably from about 500 psi to 150,000 psi. As discussed herein, the outer cover layer is preferably formed from a relatively soft polyurethane material. In particular, the material of the outer cover layer should have a material hardness, as measured by ASTM-2240, preferably less than about 60 Shore D, more preferably less than about 55 Shore D, and most preferably less than about 50 Shore D. The outer cover layer hardness, as measured on the golf ball, is preferably greater than about 50. The inner cover layer preferably has a material hardness less than 72 Shore D, more preferably less than about 70 Shore D, and most preferably, less than about 68 Shore D. It is preferred that the center, outer core layer, and inner cover layer each have a different hardness and more preferably, that the hardness progressively increases away from the center until reaching the outer cover layer, i.e., the outer core layer is harder than the center and the inner cover layer is harder than the outer core layer.

The overall outer diameter ("OD") of the center is preferably from about 0.375 in to about 1.4 in, more preferably from about 0.5 in to about 1.25 in, and most preferably from about 0.9 in to about 1.2 in. The OD of the outer core layer is preferably from about 1.4 in to about 1.62 in, more preferably from about 1.52 in to about 1.59 in, and most preferably from about 1.535 in to about 1.58 in. The OD of the inner cover layer of the golf balls of the present invention is preferably greater than about 1.58 in, more preferably from about 1.59 in to about 1.66 in, and most preferably from about 1.6 in to about 1.64 in.

The present multilayer golf ball can have an overall diameter of any size. Although the United States Golf Association ("USGA") specifications limit the minimum size of a competition golf ball to 1.680 in. There is no specification as to the maximum diameter. Golf balls of any size, however, can be used for recreational play. The preferred diameter of the present golf balls is from about 1.680 in to about 1.800 in. The more preferred diameter is from about 1.680 in to about 1.760 in. The most preferred diameter is about 1.680 in to about 1.740 in.

The golf balls of the present invention should have a moment of inertia ("MOI") of less than about 83 and, preferably, less than about 82. The MOI is typically measured on model number MOI-005-104 Moment of Inertia Instrument manufactured by Inertia Dynamics of Collinsville, Conn. The instrument is plugged into a PC for communication via a COMM port and is driven by MOI Instrument Software version #1.2.

The golf balls of the present invention should have a center deflection of greater than about 4.5 mm under a load of 100 Kg. Preferably, the center deflection is greater than about 4.8 mm and, more preferably, about 5.0 mm under a load of 100 Kg. The deflection data is measured with a Stable Micro Systems, Materials Master, (model number MT-LQ) instrument commercially available from Mono Research Labs. The MT-LQ is equipped with a 500 Kg load cell, which begins measuring deflection when 60 g is placed on it.

Prior to measuring deflection, the platens are calibrated. After calibration, the operator places the sphere to be measured on the surface of the bottom platen. The top platen moves down with a crosshead speed of one in/min. When the surface of the top platen contacts the sphere and reaches a compressive force of 60 g (the trigger force), the displacement is measured as a function of force, with force being the independent variable on the x axis. The instrument measures a predetermined number of data points/min which result in a plot of displacement versus force, from which the displacement of the sphere at a load of 100 Kg can be determined.

EXAMPLE

Two golf balls were prepared according to the present invention and are designated VDC45 and VDC48 in Table I below. The VDC golf balls contained a core formed of a 1.0-in-diameter solid center and an outer core layer having a thickness of 0.275 in to form a core having an outer diameter of 1.55 in. The core was surrounded by an inner cover layer having a thickness of 0.035 in and an outer cover layer having a thickness of 0.030 in, to provide a golf ball outer diameter of 1.68 in. A control golf ball was prepared according to conventional technology. The control ball was formed of a solid core having a diameter of 1.550 in, an inner cover layer having a thickness of 0.035 in, and an outer cover layer having a thickness of 0.030 in, to provide a golf ball outer diameter of 1.68 in. The center compositions for both golf balls are presented below in Table I.

TABLE I

| Center Composition | VDC45 | VDC48 | Control |
|---|---|---|---|
| CB23 | 100.0 | 100.0 | 100.0 |
| zinc diacrylate | 25.05 | 25.05 | 27.0 |
| zinc oxide | 5.26 | 5.26 | 4.3 |
| di-tolyl disulfide | 0.63 | 0.63 | — |
| DCP-70[1] | 2.0 | 2.0 | — |
| tungsten | 33.4 | 33.4 | 12.74 |
| color dispersion | 0.07 | 0.07 | 0.14 |
| Trigonox-265[2] | — | — | 0.53 |

[1]DCP-70 is dicumyl peroxide on a binder in pellet and is commercially available from Elastochem, Inc. of Chardon, OH
[2]a peroxide mixture on filler commercially available from Akzo Nobel Chemicals Inc. of Chicago, IL The outer core layer composition for both VDC balls comprises high-Mooney-viscosity CB23 polybutadiene, zinc diacrylate, zinc oxide, DCP-70, Kurary TP 251, Varox 231XL, and a color dispersion. The inner cover layers were the same construction for both VDC balls and the control ball. The inner cover layers were formed of a 50/50 Na/Li blend of SURLYN® 8945 and SURLYN® 7940. The outer cover layer of the VDC45 ball comprises a PMS1088 prepolymer, commercially available from Polyurethane Specialties Co. (77.8%) cured with Ethacure 300, commercially available from Albemarle Corp. (18.7%), and white dispersion, commercially available from Harwich Chemical (3.5%).

The outer cover layer of the VDC48 ball comprises a Vibrathane B-625 prepolymer, commercially available from Uniroyal (80.5%; NCO level: 6.1–6.6%) cured with Ethacure 300, commercially available from Albemarle Corp. (16%), and white dispersion, commercially available from Harwich Chemical (3.5%).

The VDC balls were formed in two different constructions, one with an outer cover layer having a material Shore D hardness of about 45, and a second with an outer cover layer having a material Shore D hardness of about 48. The VCD balls were tested for a variety of golf ball properties, such as ball compression, center hardness (interior and surface), core layer hardness, inner cover layer hardness, cover hardness, and compared to the Control ball, also tested for the same properties.

TABLE II

| Ball Properties | VDC45 | VDC48 | Control |
|---|---|---|---|
| Ball Compression (Atti) | 96 | 96 | 85 |
| Center-surface hardness[1] (Shore C) | 73.3 | 73.3 | |
| Outer Core Layer hardness[1] (Shore C) | 83.3 | 83.3 | |
| Inner Cover Layer hardness[1] (Shore D) | 62.8 | 62.8 | |
| Cover hardness[1] (Shore D) | 56 | 58 | 57 |
| moment of inertia (g · cm$^2$) | 80.73 | 80.73 | 81.11 |
| CoR | 0.815 | 0.817 | 0.815 |

[1]hardness measured directly on the golf ball (as compared to material hardness)

The launch angle and spin were measured for both VDC balls and the Control ball, for a variety of golf clubs. The data for each ball, off of each club type, are presented below in Table III.

TABLE III

| | Launch Angle (°) | Spin (rpm) |
|---|---|---|
| Club: Pro Driver[1] | | |
| VDC45 | 9.5 | 3072 |
| VDC48 | 9.3 | 3134 |
| Control | 9.2 | 3357 |
| Club: Standard Driver[2] | | |
| VDC45 | 9.1 | 3091 |
| VDC48 | 9.1 | 3038 |
| Control | 9.0 | 3370 |
| Club: 8-Iron[3] | | |
| VDC45 | 19.3 | 7035 |
| VDC48 | 19.6 | 6863 |
| Control | 18.9 | 7457 |
| Club: Wedge[4] | | |
| VDC45 | 25.5 | 9335 |
| VDC48 | 25.5 | 9290 |
| Control | 25.0 | 9623 |

[1]Ball Speed: 167; Launch Angle: 9°; Spin Rate: 3500 rpm; Club: Driver; Club Head: 975D; Loft: 7.5°; Shaft: Graphite Design YS9-X
[2]Ball Speed: 160 mph; Launch Angle: 9.5°; Spin Rate: 3000 rpm; Club: Driver; Club Head: 975D; Loft: 8.5°; Shaft: X100
[3]Ball Speed: 115 mph; Launch Angle: 18.5°; Spin Rate: 9000 rpm; Club: 8-iron; Club Head: DCI Black; Loft: 40°; Shaft: X100
[4]Ball Speed: 95; Launch Angle: 24°; Spin Rate: 10400 rpm; Club: wedge; Club Head: DCI Black; Loft: 46°; Shaft: X-100

It is clear from the data presented in Table III, that the golf ball of the present invention decreases driver spin for both a Pro driver and a Standard driver. One of ordinary skill in the art is well aware that decreasing driver spin to optimize flight increases distance off the tee. Too much 8-iron spin can make approach shots into the green difficult to control whereas wedge spin is important to making approach shots stop at desired locations on the green, especially when a player is pitching or chipping to the green.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A golf ball comprising a core and a cover, wherein:
   the core has an outer diameter of no greater tan about 1.62 inches;
   the cover comprises an inner cover layer and an outer cover layer, the outer cover layer having a material hardness of less than about 60 Shore D;
   at least one of the core or the cover comprises a high-Money-viscosity rubber regrind, or a mixture of a high-Mooney-viscosity rubber regrind and a high-Mooney-viscosity rubber, the high-Mooney-viscosity rubber regrind being present in an amount of no greater than about 20 weight percent.

2. The golf ball of claim 1, wherein the core comprises a center and at least one outer core layer.

3. The golf ball of claim 2, wherein the outer core layer has an outer diameter from about 1.4 inches to about 1.62 inches.

4. The golf ball of claim 2, wherein the outer core layer comprises high-Mooney-viscosity rubber regrind.

5. The golf ball of claim 1, wherein at least one of the high-Mooney-viscosity rubber or regrind has a Mooney viscosity of between about 40 and about 80.

6. The golf ball of claim 5, wherein at least one of the high-Mooney-viscosity rubber or regrind has a Mooney viscosity of between about 45 and about 60.

7. The golf ball of claim 1, wherein the high-Mooney-viscosity rubber regrind is present in an amount between about 5 weight percent and about 20 weight percent.

8. The golf ball of claim 7, wherein the high-Mooney-viscosity rubber regrind is present in an amount of between about 8 weight percent and about 16 weight percent.

9. The golf ball of claim 1, wherein the core outer diameter is from 1.4 inches to about 1.62 inches.

10. The golf ball of claim 1, wherein the inner cover layer has a material hardness less than about 72 Shore D.

11. The golf ball of claim 10, wherein the inner cover layer has a material hardness less than about 68 Shore D.

12. The golf ball of claim 1, wherein at least one of the inner or outer cover layers comprises a material selected from the group consisting of ionic copolymers of ethylene and an unsaturated monocarboxylic acid; vinyl resins; polyolefins; polyurethanes; polyureas; polyamides; thermoplastic and thermoset resins; metallocenes; acrylic resins; thermoplastic polyesters; and non-ionic copolymers and terpolymers.

13. The golf ball of claim 1, wherein at least one of the core or cover layers are cast, reaction injection molded, liquid injection molded, injection molded, or a combination thereof.

14. The golf ball of claim 1, wherein the core has a moment of inertia of less than about 83 g·cm$_2$ and a center deflection of greater than about 4.5 mm under a load of 100 Kg.

15. The golf ball of claim 1, wherein the outer cover layer has a material hardness less than about 58.

16. The golf ball of claim 1, wherein at least one of the cover layers comprises a polyurea composition.

17. A golf ball comprising a core and a cover layer, wherein:

the core comprises a solid center and an outer core layer and has an outer diameter of less than about 1.62 inches;

the cover layer comprises an inner cover layer and an outer cover layer, the outer cover having a material hardness of no greater than about 58 Shore D; and wherein at least one of the core or outer core layer comprises a blend of high-Mooney-viscosity rubber, high-Mooney-viscosity rubber regrind, and balata.

18. A golf ball comprising a core and a cover layer, wherein:

the core comprises a solid center comprising high-Mooney-viscosity rubber and an outer core layer, and has an outer diameter of between about 1.4 and about 1.62 inches;

the cover layer comprises an inner cover layer and an outer cover layer, the outer cover having a material hardness of no greater than about 58 Shore D, and the inner cover layer has a material hardness of less than about 72; and wherein the outer core layer comprises a blend of high-Mooney-viscosity rubber regrind and balata in an amount sufficient to increase the resilience.

19. A golf ball comprising a core and a cover, wherein:

the core has an outer diameter of no greater than about 1.62 inches;

the cover comprises an inner cover layer and an outer cover layer, the outer cover layer having a material hardness of less than about 60 Shore D;

at least one of the core or the cover comprises a high-Mooney-viscosity rubber regrind, or a mixture of a high-Mooney-viscosity rubber regrind and a high-Mooney-viscosity rubber; and at least one of the cover layers comprises a polyurethane composition comprising a reaction product of at least one polyisocyanate, a polyol, and at least one curing agent.

20. A golf ball comprising a core and a cover, wherein:

the core has an outer diameter of no greater than about 1.62 inches;

the core comprises a center and at least one outer core layer;

the cover comprises an inner cover layer and an outer cover layer, the outer cover layer having a material hardness of less than about 60 Shore D; and at least one of the center or the outer core layer comprises a high-Mooney-viscosity rubber regrind, or a mixture of a high-Mooney-viscosity rubber regrind and a high-Mooney-viscosity rubber.

* * * * *